3,231,340
RECOVERY OF POTASSIUM HALIDES
FROM BRINE
Remigius A. Gaska, Midland, Mich., assignor to The Dow Chemical Company, Midland, Mich., a corporation of Delaware
No Drawing. Filed July 22, 1963, Ser. No. 296,429
12 Claims. (Cl. 23—300)

This invention relates to the separation and recovery of potassium halides from brine and, more particularly, to the recovery of potassium halides from aqueous solutions containing potassium halides, calcium chloride and/or magnesium chloride and/or other inorganic halides by the addition of a low molecular weight, polar, Lewis base-type solvent to the solution and the subsequent separation of the potassium halides from the solution.

Potassium salts are ordinarily recovered from brine solutions by evaporation or by ore flotation methods. By the precipitation of carnallite, it is possible to recover potassium chloride from brine containing calcium chloride, magnesium chloride and potassium chloride. These methods are both inefficient and costly.

Thus, it is an object of the instant invention to provide a new and efficient process for removing potassium halides from brine solutions containing potassium halides, calcium chloride and/or other inorganic halides without the need for said solution to contain magnesium chloride by the addition to said brine solution of a low molecular weight, polar, Lewis base-type solvent.

Other objects and advantages of this invention will become apparent from the following detailed description thereof.

The method of this invention is comprised essentially of admixing a low molecular weight, polar, Lewis base-type solvent with the brine solution containing the potassium halide which is to be recovered thereby precipitating the potassium halide, and then separating from the resulting solution the potassium halide so precipitated.

In practicing the method of this invention, in recovering potassium chloride from a brine solution containing, for example, potassium chloride, calcium chloride, magnesium chloride, sodium chloride, lithium chloride and strontium chloride, the specified solvent is admixed with the brine solution in amount sufficient to bring about the precipitation of the potassium chloride. It is preferable to use an amount of the solvent which brings the system to an equilibrium with respect to the precipitation. These amounts may be from as much as 50 percent of the weight of the brine to as little as between 20 and 40 percent of the brine weight. The resulting precipitate of potassium chloride is then separated from the so-treated brine by filtration or other means known in the art. The separated precipitate may be purified by washing with water and/or the specified solvent, e.g., methanol, to remove any residual brine adhering to the precipitate and subsequently drying said precipitate.

In general, in order for the brine to be suitable for use in the method of this invention, initially all the halides therein should be in solution although undissolved potassium halide may be present, and it should initially contain in solution at least 0.6 percent by weight potassium halides and at least 20 percent by weight calcium halides (e.g., calcium chloride) and/or strontium halides and/or magnesium halides (e.g., magnesium chloride).

As the temperature of the brine solution is lowered, a larger proportion of the potassium halides is recoverable. As the temperature is raised, a smaller proportion of the potassium halides is recoverable, but the precipitate contains less impurities, e.g., sodium chloride. In general, suitable temperatures to employ are normal ambient temperatures.

Solvent suitable for use in the method of the present invention include low molecular weight alcohols (e.g., methanol or ethanol), ketones (e.g., acetone), amides (e.g., dimethyl formamide), polyols (e.g., ethylene glycol), acetates and other low molecular weight, polar, Lewis base-type solvents which are, in part, at least partially miscible with said aqueous brine solutions. Preferred solvents are those having the lowest molecular weights, e.g., methanol, ethanol.

After the recovery of the potassium halides is consummated, the solvent may be recovered, if desired, from the filtrate by vaporization or liquid phase separation techniques or other known means.

Where the initial brine solution contains undissolved potassium halides, calcium chloride, magnesium chloride and/or other halides, or where the potassium halides, calcium chloride, magnesium chloride and/or metallic halides comprise an anhydrous mixture, it is preferable that a quantity of water be added to the initial mixture in an amount such that all halides other than potassium halides will be in solution before initiating the method. This procedure will insure a product substantially free of impurities.

In many brines, sodium chloride will be present in amounts equal to or greater than that of the potassium halides. Most of the sodium chloride may be removed by evaporating the brine solution containing the sodium chloride along with the potassium halides, magnesium chloride and calcium chloride until the sodium chloride precipitates out of the solution.

Where the initial brine solution is found to be far from saturation with respect to potassium halides and/or calcium chloride and/or magnesium chloride, the brine may be concentrated by evaporation until these aforesaid components have reached the desired concentration or have at least approached saturation of the initial aqueous solution with respect to the potassium halides and/or calcium chloride and/or magnesium chloride.

Preferably, the feed brine, prior to the addition of the low molecular weight, polar, Lewis base-type solvent, should be saturated with respect to calcium chloride and/or magnesium chloride and/or potassium halides.

The following examples serve to further illustrate the method of the present invention.

*Example I*

To 43,750 grams of an aqueous brine solution at 25° C. containing 41.5 percent calcium chloride, 2.74 percent potassium chloride and 0.56 percent sodium chloride and the remainder water, 18,700 grams of methanol were added thus giving a methanol concentration of 30 percent by weight of the total brine solution and methanol present. The resulting mixture was stirred for about 40 hours at 24° C.

A precipitate thereby formed and was separated from the filtrate by filtration. The wet precipitate so formed weighed about 1658 grams. After filtering off the precipitate, the filtrate obtained weighed 59,529 grams and was found to contain 0.46 percent potassium chloride. Approximately 1250 grams of solution were lost due to methanol and water evaporation.

Thus, it is seen that about 77.1 percent of that potassium chloride found in the initial aqueous solution was recovered.

EXAMPLE II

In order to show the effect of varying the temperature at which the method of this invention is carried out on the recovery of potassium chloride, the following procedures were carried out:

To 1000 grams of an aqueous brine solution at 25°

C. containing 41.5 percent calcium chloride, 2.74 percent potassium chloride and 0.56 percent sodium chloride, and the remainder water, 428 grams of methanol were added to give a methanol concentration of 30 percent by weight of the total brine solution plus methanol present. The resulting mixture was stirred for 3.7 hours at 0° C.

A wet precipitate thereby formed was separated from the resulting solution by filtration and weighed about 70 grams. The filtrate obtained weighed 1329 grams and contained 0.27 percent potassium chloride. Thus, about 87 percent of that potassium chloride found in the initial aqueous solution was recovered.

The same procedure as that stated above in Example II was carried out with another portion of the same mixture except that the mixture was stirred at 40° C. instead of 0° C.

The wet precipitate thereby formed weighed about 45 grams. The filtrate obtained weighed 1355 grams and contained 0.67 percent of potassium chloride. Thus, about a 67 percent recovery of that potassium chloride found in the initial aqueous solution was obtained.

In comparing Example I to Example II, it is sseen that as the temperature at which the method of this invention is lowered from 25° C. down to 0° C., the percent recovery of potassium chloride increases. Similar comparisons made as the temperature is raised from 25° C. to 40° C. show that the percent recovery of potassium halides decreases.

EXAMPLE III

In order to show the effect of varying the concentration of methanol in the method of the instant invention, the following procedure was carried out:

To 150 grams of an aqueous brine solution at 25° C. containing 33.5 percent calcium chloride, 2.25 percent potassium chloride and 1.36 percent sodium chloride, and the remainder water, 26.5 grams of methanol were added thus giving a methanol concentration of 15 percent by weight of the total mixture. The resulting mixture was stirred at 25° C. for 2.5 hours.

Analysis of the precipitate thereby formed showed that it contained 13.6 percent of the potassium chloride present in the initial brine solution.

The same procedure as that used in Example III was followed except that 84 grams of methanol were added to 137 grams of the initial brine solution thus giving a methanol concentration of 38 percent by weight of the total mixture.

The potassium chloride contained in the precipitate thereby formed was 57 percent of that in the initial brine solution.

Thus, as the concentration of methanol decreases, the percent recovery of potassium chloride decreases accordingly.

EXAMPLE IV

In order to show the effect of varying the amount of calcium chloride in the brine, one can compare the results obtained in Example I with those of Example III wherein the initial brine solutions at 25° C. contained 41.5 percent and 33.5 percent calcium chloride, respectively. In Example I, a recovery of 77 percent of potassium chloride was obtained utilizing a 30 percent solution of methanol as compared to a recovery of 57 percent in Example III utilizing a 38 percent solution of methanol.

Thus, as the calcium chloride concentration in the brine or the brine concentration in general is increased, the percent recovery of potassium chloride increases accordingly.

EXAMPLE V

In order to show the effect of reducing the amount of calcium chloride and, at the same time, adding an amount of magnesuim chloride approximately equivalent to that amount by which the calcium chloride was reduced, to the brine solution, the following Runs 1 and 2 were carried out:

Run 1

To 1000 grams of an aqueous brine solution at 25° C. containing 39.6 percent calcium chloride, 2.64 percent potassium chloride and 0.50 percent sodium chloride, and the remainder water, 428 grams of methanol were added thus giving a methanol concentration of 30 percent by weight of the entire mixture. The wet precipitate formed weighed 42 grams and was found to contain 74.9 percent of the potassium chloride in the initial mixture.

Run 2

The same procedure was repeated using 1204 grams of an aqueous brine solution containing 34.2 percent calcium chloride, 5.2 percent magnesium chloride, 2.9 percent potassium chloride and 1.5 percent sodium chloride, and the remainder water, at 85° C. and mixing therewith 515 grams of methanol thus giving a methanol concentration of 30 percent by weight of the entire mixture. The mixture was chilled to 25° C. and mixed for 16 hours.

The precipitate thereby formed weighed 119 grams and was found to contain 74.8 percent of the potassium chloride present in the initial solution. Only 1.7 percent magnesium chloride was present in the wet cake (mostly as mother liquor) which then could be easily removed from the potassium chloride by washing.

Thus, it is seen that calcium chloride may be substituted by magnesium chloride producing similar effects and results when used in the method of this invention.

EXAMPLE VI

Potassium bromide together with potassium chloride were separated from a brine solution using the following procedure:

To 1000 grams of an aqueous brine solution at 40° C. consisting of 40.3 percent calcium chloride, 2.8 percent potassium chloride, 0.62 percent potassium bromide and 6.2 percent sodium chloride, and the remainder water, 430 grams of methanol were added, thus giving a methanol concentration of 30 percent by weight of the entire mixture.

The wet precipitation so obtained weighed 23 grams and was found to contain 63 percent of the potassium chloride and about 2 percent of the potassium bromide present in the initial mixture. The potassium bromide recovery is quite low due to its low concentration in the starting brine solution. Increasing the initial concentration of potassium bromide in the initial brine solution will result in larger recoveries of said bromide when practicing the method of the present invention.

EXAMPLE VII

In order to show the effect of substituting methanol with other low molecular weight, polar, Lewis base-type solvents, the following examples were carried out:

To 157.6 grams of an aqueous brine solution at 25° C. containing 39.2 percent calcium chloride, 2.9 percent potassium chloride and 0.50 percent sodium chloride, and the remainder water, 19.2 grams of acetone were added. The solution was stirred for 1 hour at 25° C.

The wet precipitate so obtained was dried and was found to weigh 2.3 grams and to contain 85.5 percent potassium chloride or 43.1 percent of the potassium chloride present in the initial mixture.

To 166.1 grams of the same brine as described above in Example VII, 24.4 grams of ethanol were added. The solution was stirred for 1 hour at 25° C.

The wet precipitate so obtained was dried and was found to weigh 2.3 grams and to contain 80 percent potassium chloride or 38.4 percent of the potassium chloride present in the initial mixture.

The above procedure was repeated; however, to 92.2 grams of the above brine, 56.4 grams of ethylene glycol were added.

The wet precipitate, after drying, was found to weigh 1.75 grams and to contain 93.3 percent potassium chloride or 61.0 percent of the potassium chloride present in the initial mixture.

Various modifications can be made in the method of the instant invention without departing from the spirit or scope thereof, for it is to be understood that I limit myself only as defined in the appended claims.

What is claimed is:

1. A method of separating potassium halides from an aqueous solution thereof containing potassium halides and at least one of the chlorides of the group consisting of calcium chloride and magnesium chloride which comprises admixing a low molecular weight, polar, Lewis base-type solvent selected from the group consisting of methanol, ethanol, acetone and ethylene glycol in an amount sufficient to provide a concentration of 10–50 percent by weight of the final mixture, said solvent being at least partially miscible with said aqueous solution, thereby to precipitate the potassium halides and separating the potassium halides so precipitated from said solution.

2. The method according to claim 1 wherein said aqueous solution contains at least 20 percent by weight calcium chloride.

3. The method according to claim 1 wherein said aqueous solution contains at least 20 percent by weight magnesium chloride.

4. The method according to claim 1 wherein said aqueous solution contains at least 20 percent by weight of a combination of calcium chloride and magnesium chloride.

5. The method according to claim 1 wherein said aqueous solution contains at least 0.6 percent by weight of potassium halides.

6. The method according to claim 1 wherein said low molecular weight, polar, Lewis base-type solvent is added in amounts more than 20 percent and less than 50 percent of the weight of the initial brine solution.

7. The method according to claim 1 wherein at least one of the potassium halides is potassium chloride.

8. The method according to claim 1 wherein at least one of the potassium halides is potassium bromide.

9. The method according to claim 1 wherein the potassium halides are potassium chloride and potassium bromide.

10. The method according to claim 1 wherein the initial aqueous solution containing potassium halides and at least one of the chlorides of the group consisting of calcium chloride and magnesium chloride is evaporated down until enough water is driven off so as to approach saturation of the initial aqueous solution with respect to at least one of the potassium halides.

11. The method according to claim 1 wherein the initial aqueous solution containing potassium halides and at least one of the chlorides of the group consisting of calcium chloride and magnesium chloride is evaporated down until enough water is driven off so as to approach saturation of the initial aqueous solution with respect to the calcium chloride.

12. The method according to claim 1 wherein the initial aqueous solution containing potassium halides and at least one of the chlorides of the group consisting of calcium chloride and magnesium chloride is evaporated down until enough water is driven off so as to approach saturation of the initial aqueous solution with respect to the magnesium chloride.

References Cited by the Examiner

UNITED STATES PATENTS

| | | | |
|---|---|---|---|
| 1,232,156 | 7/1917 | Wrinkle | 23—39 |
| 1,774,040 | 8/1930 | Riisberg | 23—38 XR |
| 2,002,797 | 5/1935 | Reich | 23—312 XR |

FOREIGN PATENTS

| | | |
|---|---|---|
| 260,141 | 5/1913 | Germany. |
| 255,042 | 4/1928 | Great Britain. |
| 316,548 | 10/1930 | Great Britain. |
| 331,236 | 6/1930 | Great Britain. |
| 727,271 | 3/1955 | Great Britain. |

NORMAN YUDKOFF, *Primary Examiner.*

GEORGE D. MITCHELL, *Examiner.*